UNITED STATES PATENT OFFICE.

THOMAS G. BLACKLOCK, OF BROOKLYN, NEW YORK, ASSIGNOR TO PETER B. OLNEY, JR., TRUSTEE, OF NEW YORK, N. Y.

BAKING COMPOUND.

1,234,858.  Specification of Letters Patent.  Patented July 31, 1917.

No Drawing.  Application filed December 23, 1916. Serial No. 138,578.

*To all whom it may concern:*

Be it known that I, THOMAS G. BLACKLOCK, a citizen of the United States, residing at Brooklyn, in the county of Kings and State of New York, have invented certain new and useful Improvements in Baking Compounds, of which the following is a full, clear, and exact description.

The invention upon which the present application for patent is based, is a novel and highly useful improvement in the method of making dough in which cream of tartar baking powder or its chemical equivalent enters as an ingredient and operates as the leavening agent. The object which I have had primarily in view in the development and application of the invention is to improve the quality of biscuits, muffins, pancakes, crumpets and the like, made in accordance therewith, and this I accomplish by processing the cereal ingredients used in making the same in such manner that when blended or combined with the other material used in a dry form, constituting what is commercially known as prepared flour, and mixed with water for the preparation of dough or batter for cooking, the saccharification of the starch will proceed with greater rapidity than under ordinary conditions, and the dough will become thoroughly shortened, so that the gas evolved from the leavening will penetrate it evenly, splitting it to form an increased number of cells, whereby in baking it will spring higher, bake more evenly and produce a more palatable, digestible and nutritious food.

In carrying out my improved process, I employ, in the main, the ordinary ingredients which are commonly used in making biscuits, muffins and other articles above named, but combine therewith a processed compound of farina, hominy and rice, in about equal proportions and in a finely divided form. The proportion which such compound may bear to the mixture as a whole may vary to some extent, but the best results I have found to follow from the following generic formula:

1 cup wheat flour,
⅓ cup farina,
⅓ cup hominy,
⅓ cup rice meal,
2 teaspoons baking powder,
2 teaspoons salt.

To this mixture water, milk or equal parts of each are to be added, to an amount of approximately 65% when a dough that may be rolled and shaped is desired, and 100% when a batter for the griddle is to be produced.

For laxative purposes, or whenever desired, clean, edible bran of wheat, corn or rice may be used with the corresponding cereals in about the proportions of 40% bran in a finely divided condition to 60% of the pure meal. This while in many cases desirable is not however essential.

It will be understood that cream, sugar, butter, eggs and spices may also be added to vary the character and quality of the product, and raisins, fruits or nuts may also be used with the dough if so desired.

It will be found that in a comparatively few minutes after the above named ingredients are mixed and water added, cause a rapid absorption of the water and the gelatinization of the starch content, which continues until a complete hydrolysis of the starch is accomplished. As a result the dough or the batter, as the case may be, is shortened and split by the gases minutely and evenly, and this secures a greater expansion and permits a more uniform baking, with the production of a better crust or outer caromeling action of the sugar on exposure to the heat of the oven or griddle than has heretofore been found practicable or even possible under ordinary conditions.

The processing of the cereals which is implied by the above description is effected in substantially the following manner. Farina, hominy and rice meal, all well known commercial products, are intimately mixed, in equal proportions and water or its equivalent is then added to them to increase the amount of moisture which they normally contain to about 25% of their total weight. If bran be used this mixture is then combined with a blend of the clean edible brans of the same cereals, and the whole then passed through a double jacketed steam sterilizer, in which it is agitated for about 30 minutes at the same time being exposed to a temperature beginning at 110° F. and running up not to exceed 180° F. as the mixture advances through the device. The hydrolysis of the starch proceeds during this treatment, developing dextrose gelatinized starch, and the intermediate products between dextrose and gelatinized starch, and the composition is what is known in the art as processed.

When rice meal is used in addition to the farina and hominy the time necessary for the transformations which occur is much shortened, its starch varying from the others in fermenting time. This result is still further hastened by the addition of the brans of the cereals to the mixture to be processed, for which the refined cereals themselves develop dextrose and gelatinized starch in about 30 minutes under the temperatures given above, the addition of rice meal and bran will hasten and facilitate this action.

The sterilizing process may vary considerably with respect to the hydrolyzing periods of time and the percentage of water added as well as the relative amounts of cereals and cereal brans used may also be substantially varied without departing from the invention.

The presumable action and effect of the addition of the above described processed compound to the flour used in making dough or batter in connection with baking powder as a leavening agent is that the dextrose and gelatinized starch are present when the water is added to the composition, and this permits the moisture to seep through and penetrate into the flour mass quickly and evenly. This exposes the gluten content to the softening action of the ingredients and water rendering the dough or batter very susceptible to minute divisions as the leavening content combining with water develops into gas. The dextrose and gelatinized starch act as substitutes for sugar and shortening through their influence in developing a proper consistency of the dough or batter and result in high proof, uniform baking and outside caromelizing when the dough or batter is exposed to the heat of the oven or griddle.

The baking of such articles as herein contemplated as ordinarily carried out with the use of baking powder as the leavening agent do not result in a uniformly cooked product, and when browned the center is liable to be moist and soggy unless eggs or milk and butter fats are employed as ingredients to bring about a condition in the dough or batter which will cause it to split minutely so that the baked material is light and fluffy in texture. By the use of my processed compound in the dough or batter, however, all objections are remedied and such use is thoroughly effective in producing a uniformly baked and browned product light and fluffy in texture, and more nutritious, digestible and palatable than would otherwise result.

It may be here noted that salt is included in the above formula comprising the processed compound of cereals, and I would now state that when the salt is added to the processed compound in lieu of the mixture of the latter with flour it is incorporated therewith by the following process.

Preceding the processing of the farina, hominy and rice meal a solution of salt and water is prepared, the salt being in the proportion of from ½ to 5% of the cereals, and this solution is dropped slowly through a needle valve upon the branny constituents of the compound. These latter, together with the salt solution, go into the sterilizer and as soon as they become treated the saline solution is uniformly distributed over branny particles, and as soon as it leaves the sterilizer it crystallizes thereon and remains attached thereto forming a permanent ingredient of the processed compound.

Having now described my invention, what I claim is:

1. A compound for use in the making of dough or batter for baking with the aid of baking powder comprising processed farina, hominy and rice meal.

2. A compound for use in the making of dough or batter for baking with the aid of baking powder comprising substantially equal parts of processed farina, hominy and rice meal.

3. A prepared flour for use in making dough or batter comprising wheat flour, a processed mixture of farina, hominy and rice meal and baking powder as a leavening agent, in substantially the proportion herein set forth.

4. A prepared flour for use in making dough or batter comprising wheat flour, a processed compound of equal parts of farina, hominy and rice meal, and baking powder as a leavening agent.

5. A compound for admixture with wheat flour in the making of dough or batter for baking with the aid of baking powder, composed of a processed compound comprising farina, hominy and rice meal, together with the bran of those cereals, as set forth.

6. A prepared flour for use in making dough or batter comprising wheat flour, a processed compound of farina, hominy and rice meal, the clean edible brans of these cereals, and baking powder as a leavening agent.

7. A compound for admixture with wheat flour for the making of dough or batter for baking with baking powder as a leavening agent, comprising processed farina, hominy, rice meal and salt.

In testimony whereof, I hereunto affix my signature.

THOMAS G. BLACKLOCK.